United States Patent
Alves et al.

(10) Patent No.: US 10,737,586 B2
(45) Date of Patent: Aug. 11, 2020

(54) CONVERTER ARCHITECTURE

(71) Applicant: Apple Inc., Cupertino, CA (US)

(72) Inventors: Jeffrey M. Alves, Pleasanton, CA (US); Peng Wu, Sunnyvale, CA (US); Yehonatan Perez, Menlo Park, CA (US); Kisun Lee, Pleasanton, CA (US); Philip Juang, Mountain View, CA (US)

(*) Notice: Subject to any disclaimer, the term of this patent is extended or adjusted under 35 U.S.C. 154(b) by 0 days.

(21) Appl. No.: 16/012,118

(22) Filed: Jun. 19, 2018

(65) Prior Publication Data

US 2018/0301986 A1 Oct. 18, 2018

Related U.S. Application Data

(63) Continuation of application No. 15/764,438, filed as application No. PCT/US2016/053093 on Sep. 22, 2016, now abandoned.

(60) Provisional application No. 62/235,129, filed on Sep. 30, 2015.

(51) Int. Cl.
| | |
|---|---|
| *B60L 58/20* | (2019.01) |
| *B60L 3/00* | (2019.01) |
| *H02J 7/00* | (2006.01) |
| *H02J 9/06* | (2006.01) |

(52) U.S. Cl.
CPC .............. *B60L 58/20* (2019.02); *B60L 3/003* (2013.01); *H02J 7/007* (2013.01); *H02J 7/0068* (2013.01); *B60L 2210/10* (2013.01); *B60L 2210/12* (2013.01); *B60L 2210/14* (2013.01); *H02J 9/06* (2013.01)

(58) Field of Classification Search
CPC ........ H02J 7/0054; H02J 7/0068; H02J 7/007; H02J 9/06
See application file for complete search history.

(56) References Cited

U.S. PATENT DOCUMENTS

| | | | |
|---|---|---|---|
| 7,365,998 B2 | 4/2008 | Kumar et al. | |
| 2003/0184937 A1* | 10/2003 | Kanouda | H02J 9/061 361/90 |
| 2005/0048335 A1 | 3/2005 | Fields, III et al. | |

(Continued)

FOREIGN PATENT DOCUMENTS

| | | |
|---|---|---|
| EP | 1717938 | 11/2006 |
| EP | 2193954 | 6/2010 |
| FR | 2896744 | 8/2007 |

*Primary Examiner* — Fred E Finch, III
*Assistant Examiner* — Rafael O. De León Domenech
(74) *Attorney, Agent, or Firm* — Polsinelli PC

(57) ABSTRACT

Implementations described and claimed herein provide systems and methods for supplying voltage to a load and battery. In one implementation, an unregulated DC-to-DC converter is electrically connected to a first energy source to down convert a first voltage supplied by the first energy source. A load is electrically connected to the unregulated DC-to-DC converter to receive the down converted first voltage. A regulated DC-to-DC converter is electrically connected to the unregulated DC-to-DC converter to regulate the down converted first voltage to a second voltage. A second power source is electrically connected to the regulated DC-to-DC converter to charge the second power source using the second voltage, and the second power source is switchably connectable to the load.

19 Claims, 10 Drawing Sheets

(56) References Cited

U.S. PATENT DOCUMENTS

| | | | |
|---|---|---|---|
| 2009/0206804 A1* | 8/2009 | Xu | H02M 3/1584 |
| | | | 323/234 |
| 2011/0215640 A1* | 9/2011 | Donnelly | H02J 1/10 |
| | | | 307/21 |
| 2012/0113687 A1 | 5/2012 | Wildrick | |
| 2012/0187919 A1 | 7/2012 | Andersson et al. | |
| 2014/0334185 A1* | 11/2014 | Hosotani | H01M 10/44 |
| | | | 363/15 |
| 2015/0046001 A1 | 2/2015 | Park et al. | |
| 2015/0298631 A1* | 10/2015 | Belger | B60R 16/033 |
| | | | 307/10.1 |
| 2015/0311831 A1* | 10/2015 | Yamada | B60L 58/12 |
| | | | 318/139 |

* cited by examiner

CONVERTER ARCHITECTURE

CROSS-REFERENCE TO RELATED APPLICATION

This Patent Cooperation Treaty (PCT) patent application claims priority to U.S. Provisional Patent Application No. 62/235,129, entitled "Converter Architecture" and filed on Sep. 30, 2015, which is specifically incorporated by reference in its entirety herein.

TECHNICAL FIELD

Aspects of the present disclosure generally involve a converter architecture for supplying voltage to a load and a battery.

BACKGROUND

Vehicles, including electric or hybrid vehicles, and other devices are generally powered by a high voltage battery or other high energy store. However, such vehicles and devices typically include components or subsystems, such as battery controllers, motor controllers, air conditioning systems, and the like, operating at a relatively lower voltage. Conventionally, a converter down converts the high voltage powering the vehicle or device to the lower voltage at which these components and subsystems operate. Such conventional converters are often inefficient and suffer from load transients that are absorbed by and may cause damage to a low voltage battery.

SUMMARY

In one implementation, an unregulated DC-to-DC converter is electrically connected to a first energy source to down convert a first voltage supplied by the first energy source. The down converted first voltage may be supplied to a bus, and a load is electrically connected to the bus and the unregulated DC-to-DC converter to receive the down converted first voltage. A regulated DC-to-DC converter is electrically connected to the bus to regulate the otherwise unregulated voltage. A second power source is electrically connected to the regulated DC-to-DC converter to charge the second power source using the second voltage, and the second power source is switchably connectable to the load. Other implementations are described herein.

BRIEF DESCRIPTION OF THE DRAWINGS

The description will be more fully understood with reference to the following Figures, which are presented as various implementations of the disclosure and should not be construed as a complete recitation of the scope of the disclosure.

DETAILED DESCRIPTION

Aspects of the present disclosure involve systems and methods for supplying voltage to a load. In one aspect, a converter, such as a direct current-to-direct current ("DC-to-DC") converter, converts a relatively higher direct current voltage of a high energy store to a relatively lower direct current voltage utilized by lower voltage loads. For instance, a vehicle or other device typically includes a high energy store, such as a high voltage battery, providing motive current to one or more electric drive motors. The vehicle or device may also include lower voltage components, including, but not limited to, electric power steering systems, navigation systems, dashboard systems, and/or the like, that operate at a lower voltage than the drive motor(s). The lower voltage components are coupled to a low voltage bus that is powered with the high energy store by way of an unregulated DC-to-DC converter. Additionally, the output of the unregulated DC-to-DC converter provides power to a regulated DC-to-DC converter for charging a low voltage battery, which may nominally operate at the same voltage as the low voltage bus. The regulated converter provides a regulated voltage to a load/source even as load conditions change on the low voltage battery (or more generally the low voltage bus) and/or input voltages change due to varying inputs at the unregulated converter. The low voltage battery may also power the low voltage components, such as through switchably connecting the low voltage battery to the low voltage bus, if a failure is experienced at the unregulated DC-to-DC converter, or if the low voltage bus is otherwise not powered by the unregulated DC-to-DC converter.

In contrast, a conventional isolated regulated converter supplies voltage to a load and charges a low voltage battery. A regulated converter generally transforms a direct current ("DC") source voltage from one level to another, with input and output voltages being dielectrically isolated and the output voltage being regulated at a constant level. Thus, loads not requiring a regulated supply voltage are nonetheless supplied a regulated voltage. Additionally, conventional architectures utilizing a regulated converter are often inefficient, and when the regulator is not isolated can suffer from load transients being injected onto the low voltage bus and absorbed by whatever is connected to the bus. Load transients are brief disturbances, such as spikes in voltage or current, induced by a load on the low voltage bus. These disturbances can damage the low voltage battery. As such, the presently disclosed technology includes an unregulated DC-to-DC converter providing power to a low voltage load via a low voltage bus and to a regulated DC-to-DC converter or other regulator for charging a low voltage battery. The regulator may also be used to direct power to the low voltage load in the event that the unregulated DC-to-DC converter malfunctions.

Figure 1:
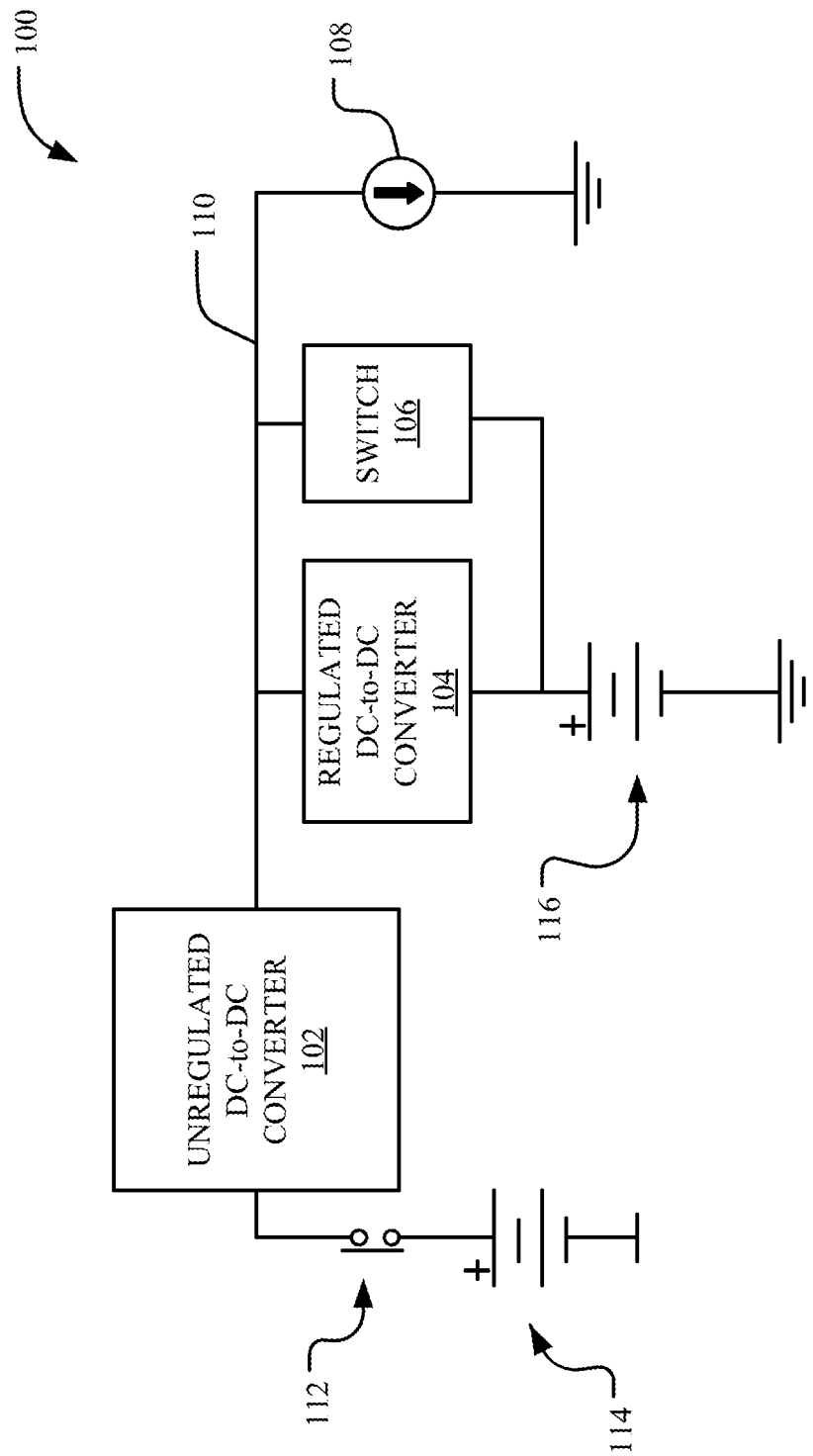
FIG. 1 is a diagram illustrating an example load voltage supply system using a combination of an unregulated direct current to direct current (DC-to-DC) converter and a regulated DC-to-DC converter.

To begin a detailed description of an example low voltage supply system 100, reference is made to FIG. 1. In one implementation, the system 100 includes an unregulated DC-to-DC converter 102 connected to a regulated DC-DC converter 104 and one or more loads 108 via the low voltage bus 110. The loads 108 may include various components and subsystems operating a low voltage relative to a first energy source 114, which may be, for example, a high voltage battery.

The first energy source 114 may be connected to the unregulated DC-to-DC converter 102 through a contactor 112 that is electrically controlled. It will be appreciated that the first energy source 114 may also provide energy to other systems, including, but not limited to, an electric motor, that operate at a relatively different and typically higher voltage than the loads 108.

The unregulated DC-to-DC converter 102 is the primary source for supplying power to the loads 108 via the low voltage bus 110. Generally, a DC-to-DC converter may be used to step down voltage, to step up voltage, or to both step up and down voltage. In one implementation, the unregulated DC-to-DC converter 102 receives a high voltage from the first energy source 114 and supplies a sufficient low voltage to the loads 108. Stated differently, the unregulated DC-to-DC converter 102 down converts the high voltage of the first energy source 114 to a lower voltage suitable for use by the loads 108.

The unregulated DC-to-DC converter 102 may also be a power source for changing the second energy source 116, such as a low voltage battery. In one implementation, the second energy source 116 is charged and maintained at a nominal voltage and state of charge. The regulated DC-to-DC converter 104 may be disposed between the unregulated DC-to-DC converter 102 and the second energy source 116 to supply a regulated voltage and charge current to the second energy source 116. The regulated DC-to-DC converter 104 compensates for any voltage variances of the low voltage bus 110, which may occur due to different levels of power drawn by the loads 108. Supplying a controlled, stable voltage to the second energy source 116 extends a life of the second energy source 116, assists with charging algorithms, and/or provides other advantages.

The unregulated DC-to-DC converter 102 is typically more efficient than the regulated DC-to-DC converter 104. Because the regulated DC-to-DC converter 104 may be limited to operating while charging the second energy source 116, the system may operate more efficiently overall as compared to one with a regulated converter supplying both the loads and low voltage battery. The regulated DC-to-DC converter 104, for example, may provide a charge current varying between a level for charging the second energy source 116 from a depleted state to a level maintaining a charge of the second energy source 116 (e.g., a trickle charge). The combination of the unregulated DC-to-DC converter 102 and the regulated DC-to-DC converter 104 thus increases the efficiency of the system 100, while providing a regulated output, when needed, to the second energy source 116. Stated differently, the unregulated DC-to-DC converter 102 provides efficient power to the loads 108 via the low voltage bus 110, and the regulated DC-to-DC converter 104 provides regulated output for charging the second energy source 116.

The regulated DC-to-DC converter 104 further protects the second energy source 116 from transients. As the loads 108 switch on or off or draw varying amounts of power, transient voltages and spikes may be injected onto the bus 110 and cause damage to the second energy source 116 if it were connected directly to the bus. The regulated DC-to-DC converter 104 is disposed between the bus 110 and the second energy source 116 to regulate the transient voltage variations and thus effectively block them from being absorbed by the second energy source 116.

The unregulated DC-to-DC converter 102 may include or otherwise be associated with a transformer, which dielectrically isolates its input from its output. In some implementations, the unregulated DC-to-DC converter 102 including a high frequency transformer as an isolating barrier protects low voltage electronics, such as the loads 108 and/or the second energy source 116, from high voltage disturbances that may be transferred from the first energy source 114 or other high voltage systems via the bus 110.

Being connectable to the low voltage bus, the secondary energy source 116 may provide power to the loads 108 in the event of a malfunction of the unregulated DC-to-DC converter 102 or when the unregulated DC-to-DC converter is disabled. Such malfunctions may include, for example, instances where the unregulated DC-to-DC converter 102 fails to provide sufficient voltage to the loads 108, by way of the low voltage bus 110. Besides disabling (e.g., turning it off) the unregulated DC-to-DC converter, the first energy source 114 may also not be coupled to the low voltage bus 110 by opening the contactor 112 during some modes of operation. In one possible implementation, a switch 106 directs power from the second energy source 116 to the loads 108 via the low voltage bus 110. The switch 106 may be any electrical component connecting the second energy source 116 to the low voltage bus 110, including, but not limited to, a transistor, a relay, a contactor, and the like. The regulated DC-to-DC converter 104 may also be bi-directional and power to the low voltage bus may be provided through the regulated DC-to-DC converter 104. Such may be beneficial when the low voltage battery voltage differs from a nominal bus voltage.

Figure 2:
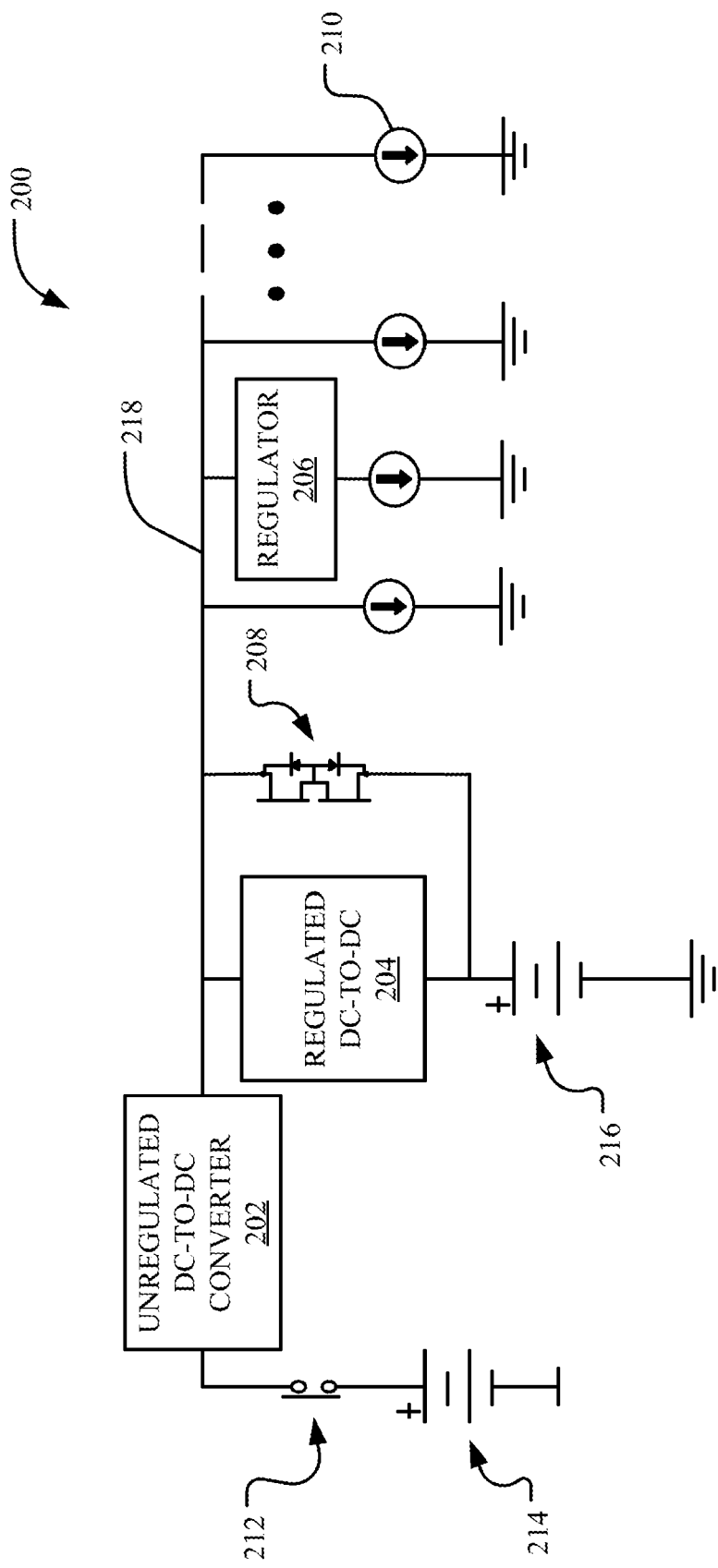
FIG. 2 is a diagram illustrating a second example load voltage supply system using combination of an unregulated direct current to direct current (DC-to-DC) converter and a regulated DC-to-DC converter

Turning to FIG. 2, an example load voltage supply and low voltage battery charging system 200 is shown. The system 200 includes a first energy source in the form of a high voltage ("HV") battery 214 and a second energy source in the form of a low voltage ("LV") battery 216. It will be appreciated by those skilled in the art that the terms "high voltage" and "low voltage" reflect a relative relationship between a nominal voltage or operating voltage range of the HV battery 214 and the LV battery 216 and are not intended to imply any particular voltage or range. In one example, high voltage refers to various traction battery voltages for driving an electric motor, and low voltage refers to a voltage or range of voltages for operating one or more loads 210, such as compressors (e.g., for air conditioning), fans, entertainment systems, and other low voltage vehicle systems.

As an example, the HV battery 214 may include a number of low voltage cells coupled in series and/or parallel to achieve an overall battery voltage with an operating range of approximately 650-900 volts of direct current ("VDC"). In one implementation, the LV battery 216 has an operating voltage range that overlaps with an operating voltage range of a LV bus 218 as configured for the loads 210. For example, the LV battery 216 may have an operating voltage range of approximately 30-50 VDC, and the LV bus 218 may have an operating voltage range of approximately 39-54 VDC. In one example, the HV battery 214 operates at a nominal voltage of approximately 800 VDC, while the LV battery 216 operates at a nominal voltage of approximately 48 VDC. In other examples, the LV battery 216 operates at a nominal voltage of approximately 24 VDC as a relatively lower voltage energy source and at a nominal voltage of approximately 72 VDC as a relatively higher voltage energy source. In still another example, the HV battery 214 has an operating voltage range of approximately 270-450 VDC, while the LV battery 216 operates at a voltage range of approximately 39-54 VDC. It will be appreciated that these voltage values and ranges are exemplary only and other values and ranges are contemplated.

In one implementation, to provide efficient power to the loads 210 via the LV bus 218 and provide regulated power to the LV battery 216 for charging, the system 200 includes an unregulated DC-to-DC converter 202 and a regulated DC-to-DC converter 204. The unregulated DC-to-DC converter, generally speaking, provides some output depending in part on the input supplied to the converter. In the case of an isolated converter including a transformer with primary and secondary windings, for example, the output voltage will be proportional to the input voltage and depend on the ratio of primary to secondary windings of the transformer. That is to say, if an unregulated converter receives an input of 800 VDC, it will provide X volts out. But if the unregulated converter is provided 400 VDC, the converter will provide X/2 volts out, instead of trying to regulate its output to a higher value. So, in the specific example of an 800 VDC primary energy source, the windings of the converter may be established to provide an output range of 39-54 VDC based on a high voltage battery range of 650-900 VDC. The loads receiving power from the low voltage bus thus are those that can operate in that range. The low voltage battery, however, may not be able to properly charge if an insufficient input voltage is provided. For example, a 48 V low voltage battery may not charge with a 39 VDC input voltage. Hence, the regulated converter is able to provide a regulated voltage sufficient for charging the battery, and able to provide a regulated voltage addressing the range of possible voltages on the low voltage bus. So, for example, when charging a 48 V low voltage battery, slightly greater than 48 V may be required and the regulated DC-to-DC converter may need to be able to supply that voltage based on low voltage bus range of 39-54 V DC.

The DC-to-DC converters may be isolated or non-isolated and include buck converters, boost converters, buck-boost converters, Cuk converters, charge-pump converters, and/or the like depending on whether the converted voltage is stepped up, stepped down, both, and/or inverted. The unregulated DC-to-DC converter 202 may be a buck converter that reduces the voltage of the HV battery 214 to a lower voltage value or range for the components connected to the LV bus 218. The regulated DC-to-DC converter 204 may also be a buck type converter to further step-down the voltage across the LV bus 218 to a voltage for charging or maintaining the LV battery 216, for instance where the operational voltage of the LV battery 216 is lower than the operational voltage of the loads 210. As a buck converter, the unregulated DC-to-DC converter 202 and the regulated DC-to-DC converter 204 may include an inductor, a transistor and/or a diode configured in a buck arrangement.

In another example where a nominal voltage of the LV battery 216 is higher than the voltage across the LV bus 218, the regulated DC-to-DC converter 204 may be a boost type converter, which increases the voltage output from the unregulated DC-to-DC converter 202. In yet another example, the regulated DC-to-DC converter 204 is a buck-boost converter. A buck-boost converter provides buck or boost functionality to decrease or increase the bus voltage, respectively, depending on the low voltage bus voltage and the demands of the LV battery 216 and/or the loads 210 in various operational modes, as discussed in more detail herein. The regulated DC-to-DC converter 204 configured as a buck-boost converter further provides bidirectional functionality, such that power may be directed from the LV bus 218 to the LV battery 216 or directed from the LV battery 216 to the LV bus 218.

In one particular implementation, the unregulated DC-to-DC converter 202 is a 4 kW isolated DC-to-DC buck converter, and the regulated DC-to-DC converter 204 is a 500 W non-isolated bidirectional buck-boost converter. The combination of the unregulated DC-to-DC converter 202 and the regulated DC-to-DC converter 204 in this implementation provides the system 200 with a $\eta$=97-98% conversion efficiency.

As described herein, an unregulated voltage is provided to the loads 210 via the LV bus 218. In one implementation, one or more of the loads 210 may utilize a regulated voltage. Thus, a regulator 206 may be operably positioned between the LV bus 218 and such load(s) 210 to provide a regulated voltage. The regulator 206 may also operate like a regulated converter, compensating the voltage provided to one or more of the loads 210 where the voltage powering the load 210 is greater than the low voltage rail on the LV bus 218. Those of ordinary skill will recognize that the regulator 206 may be a discrete component or integrated with one or more of the loads 210. In the case of a discrete component, the regulator 206 may be shared among the loads 210 or specific to a particular load 210.

A switch 208, such as a metal oxide semiconductor field effect transistor (MOSFET), may be deployed between the LV battery 216 and the LV bus 218. The switch 208 selectively supplies power to the loads 210 from the LV battery 216. For example, the switch 208 may direct power to the loads 210 from the LV battery 216 when: the HV battery 214 is unavailable to supply power (e.g., when a HV contactor 212 is open); the HV battery 214 and/or the unregulated DC-to-DC converter 202 malfunctions; and, the power supplied by the HV battery 214 needs to be supplemented.

Figure 2A:
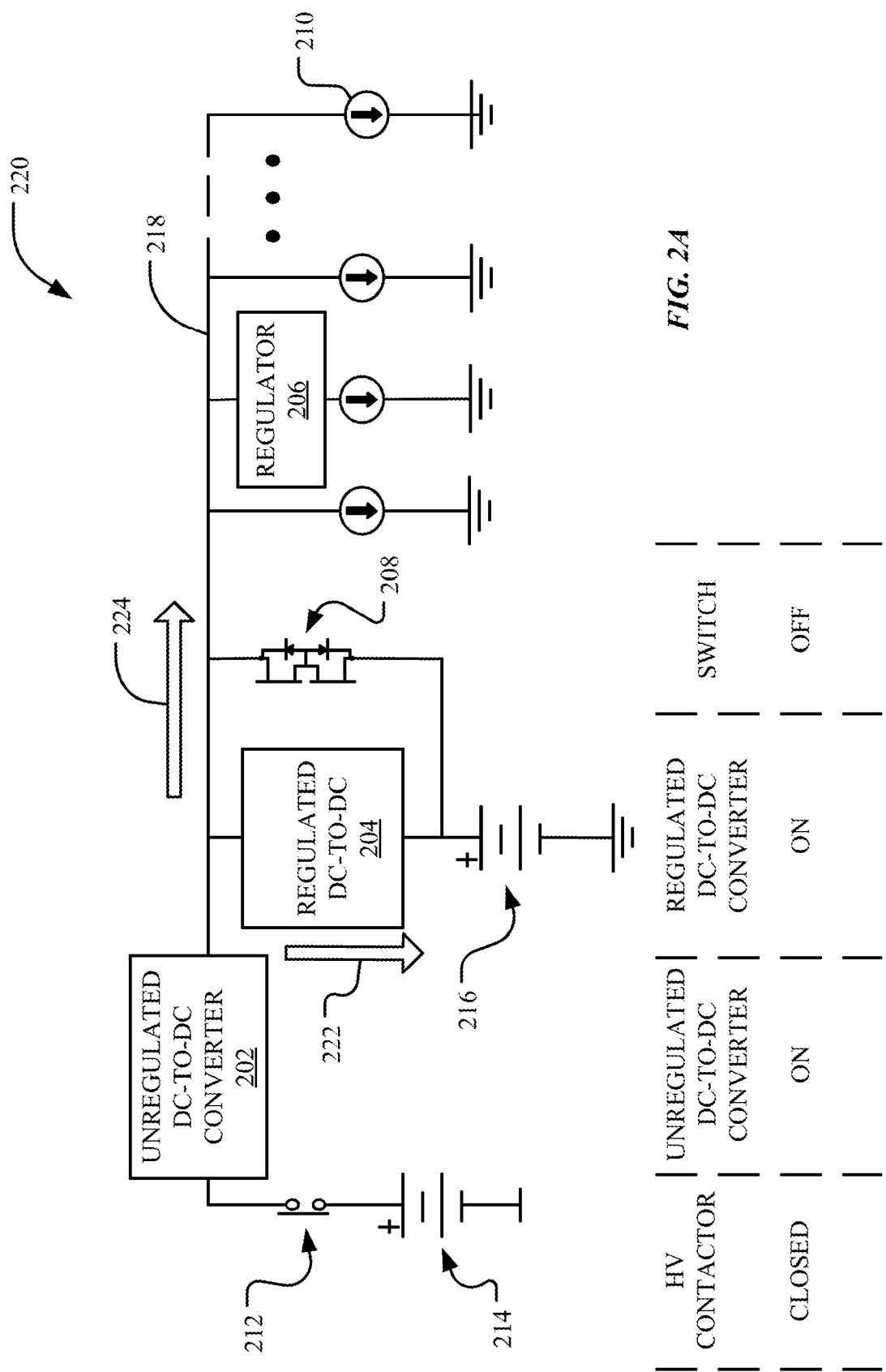
FIG. 2A is a diagram illustrating the system of FIG. 2 configured in a recovery operation mode.
Figure 2B:
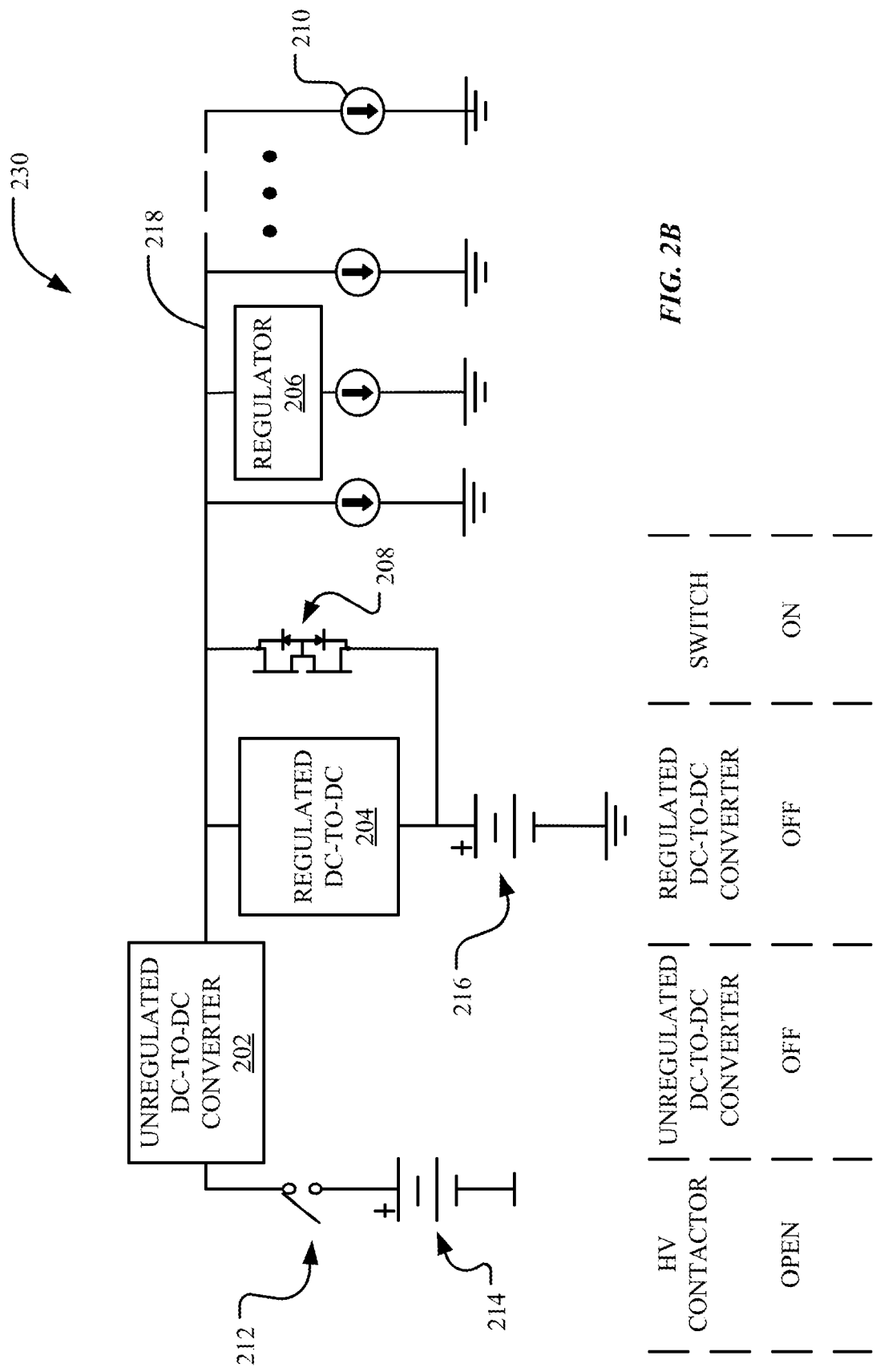
FIG. 2B is a diagram illustrating the system of FIG. 2 configured in an open contactor operation mode.
Figure 2C:
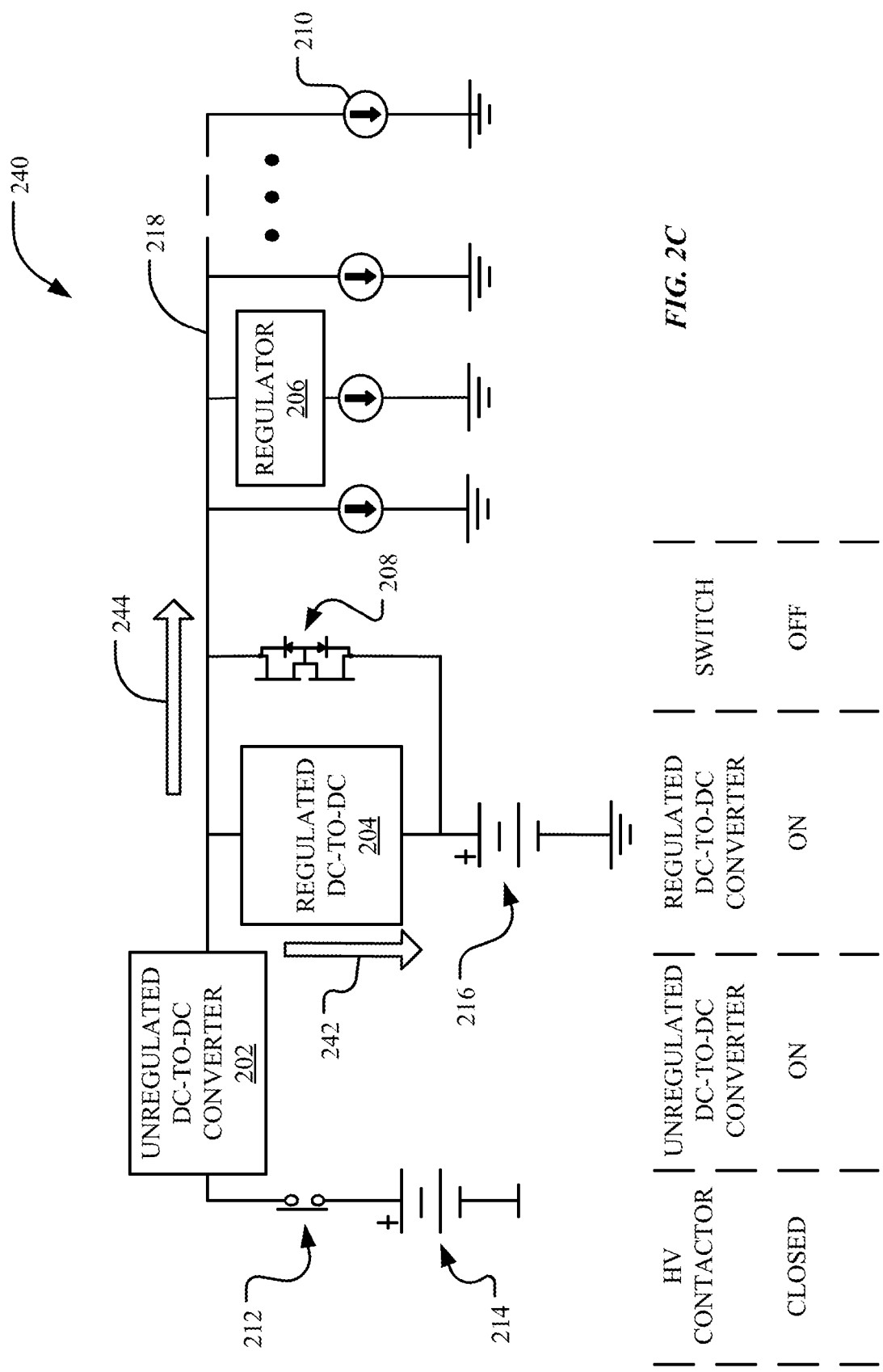
FIG. 2C is a diagram illustrating the system of FIG. 2 configured in a low power operation mode.
Figure 2D:
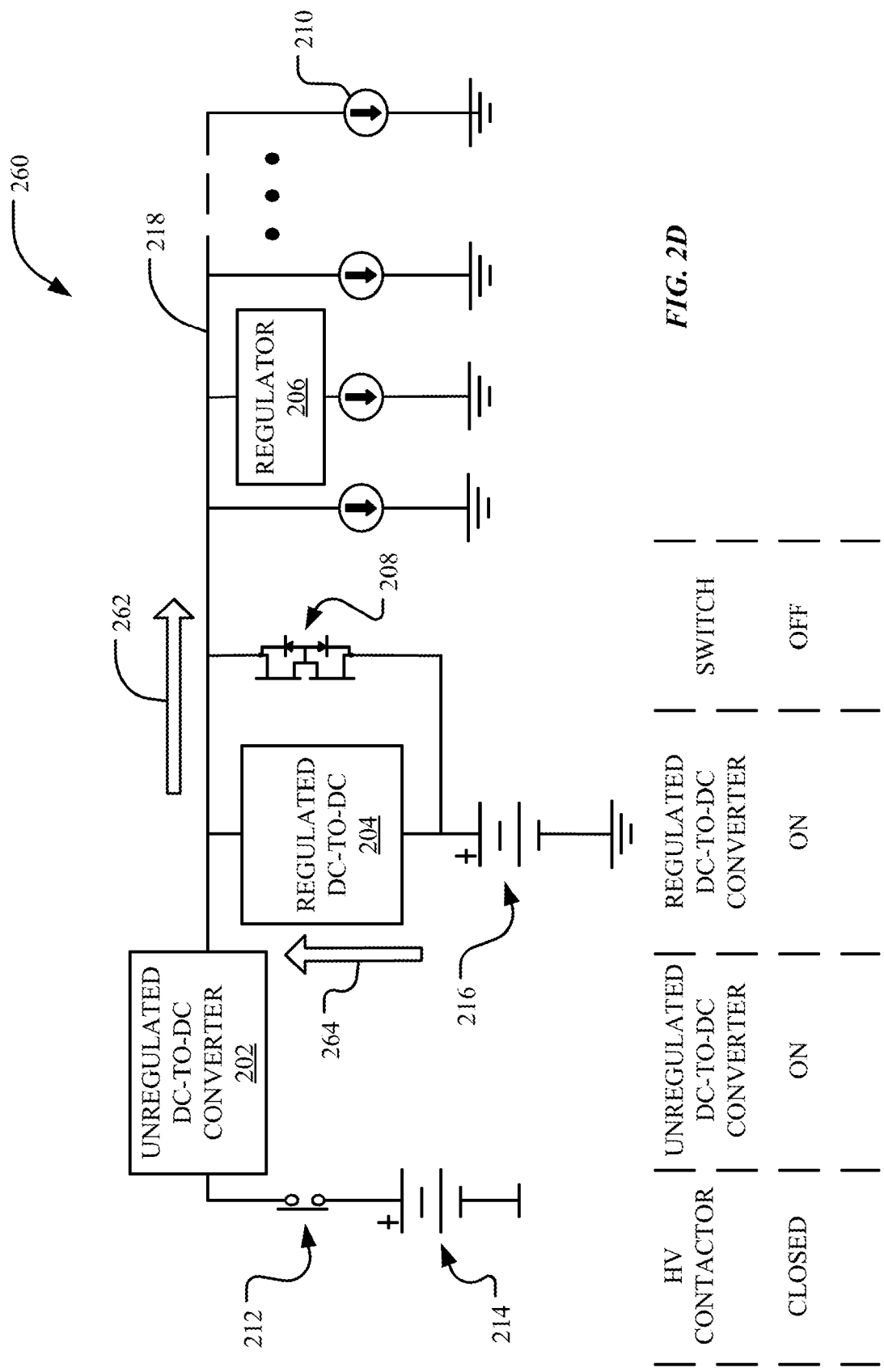
FIG. 2D is a diagram illustrating the system of FIG. 2 configured in a high power operation mode.
Figure 2E:
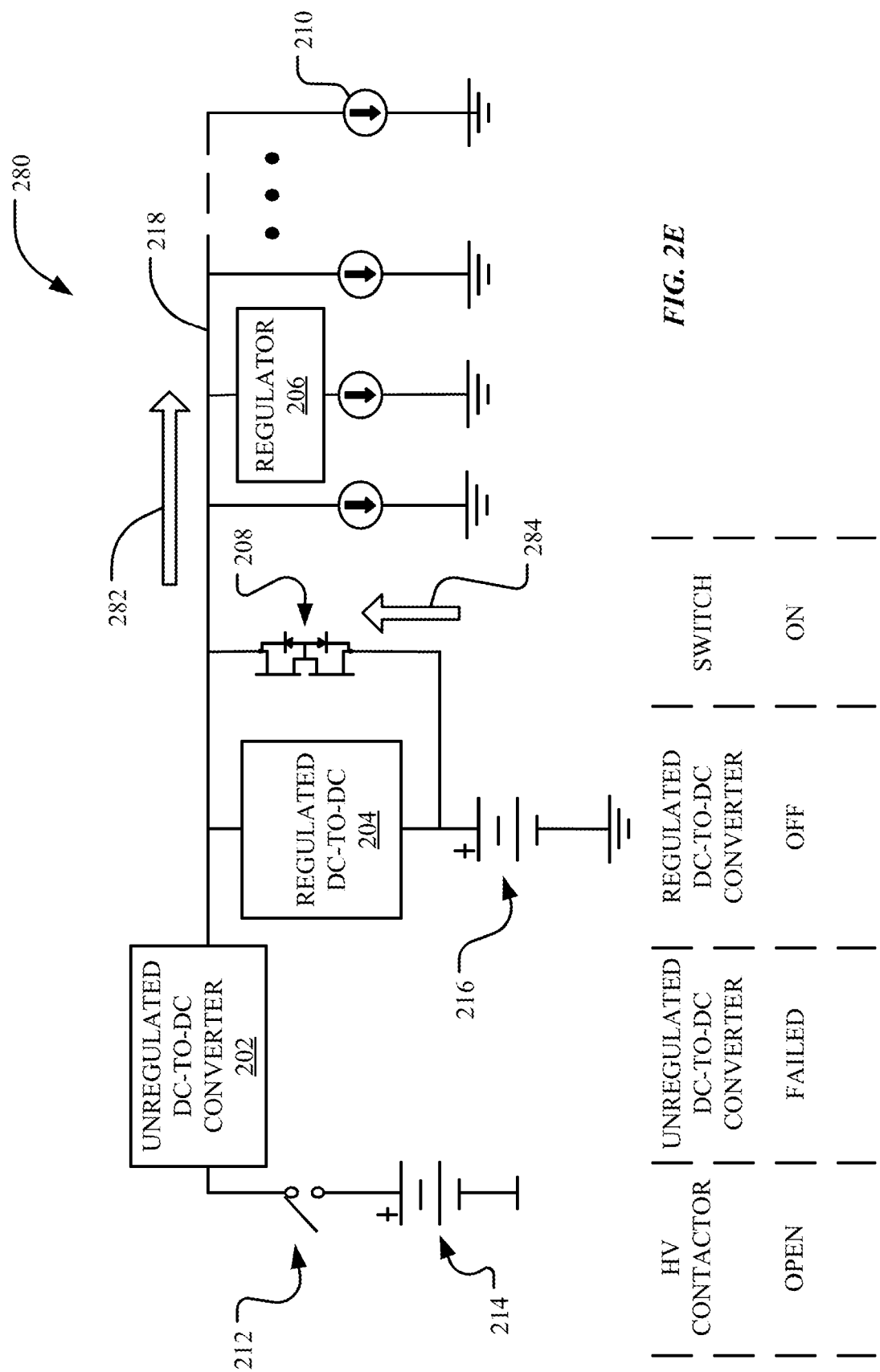
FIG. 2E is a diagram illustrating the system of FIG. 2 configured in a DC-to-DC failure operation mode.
Figure 3A:
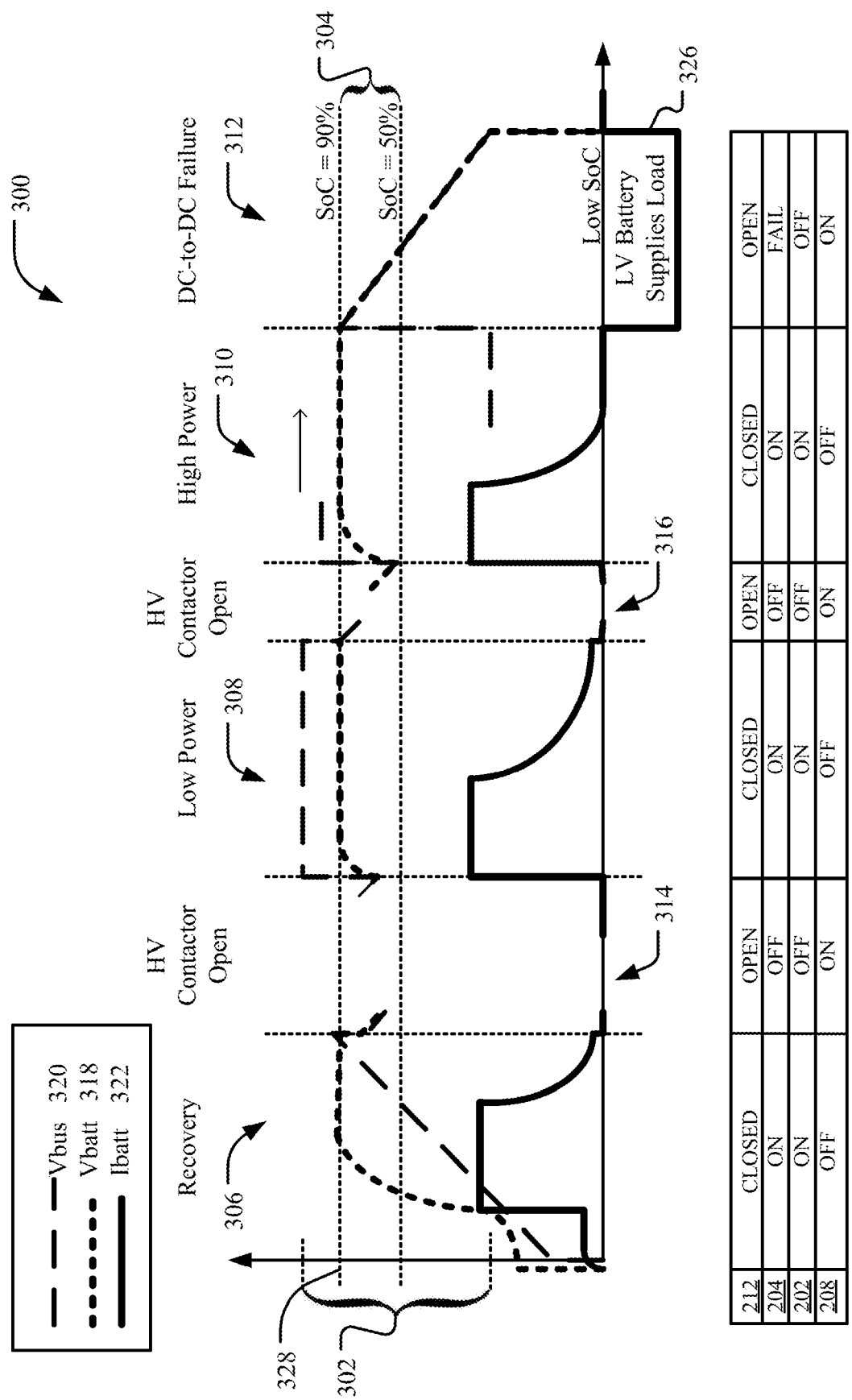
FIG. 3A is a timing diagram illustrating bus voltage, low voltage battery voltage and low voltage battery current of the system of FIG. 2 in various example operational stages.
Figure 3B:
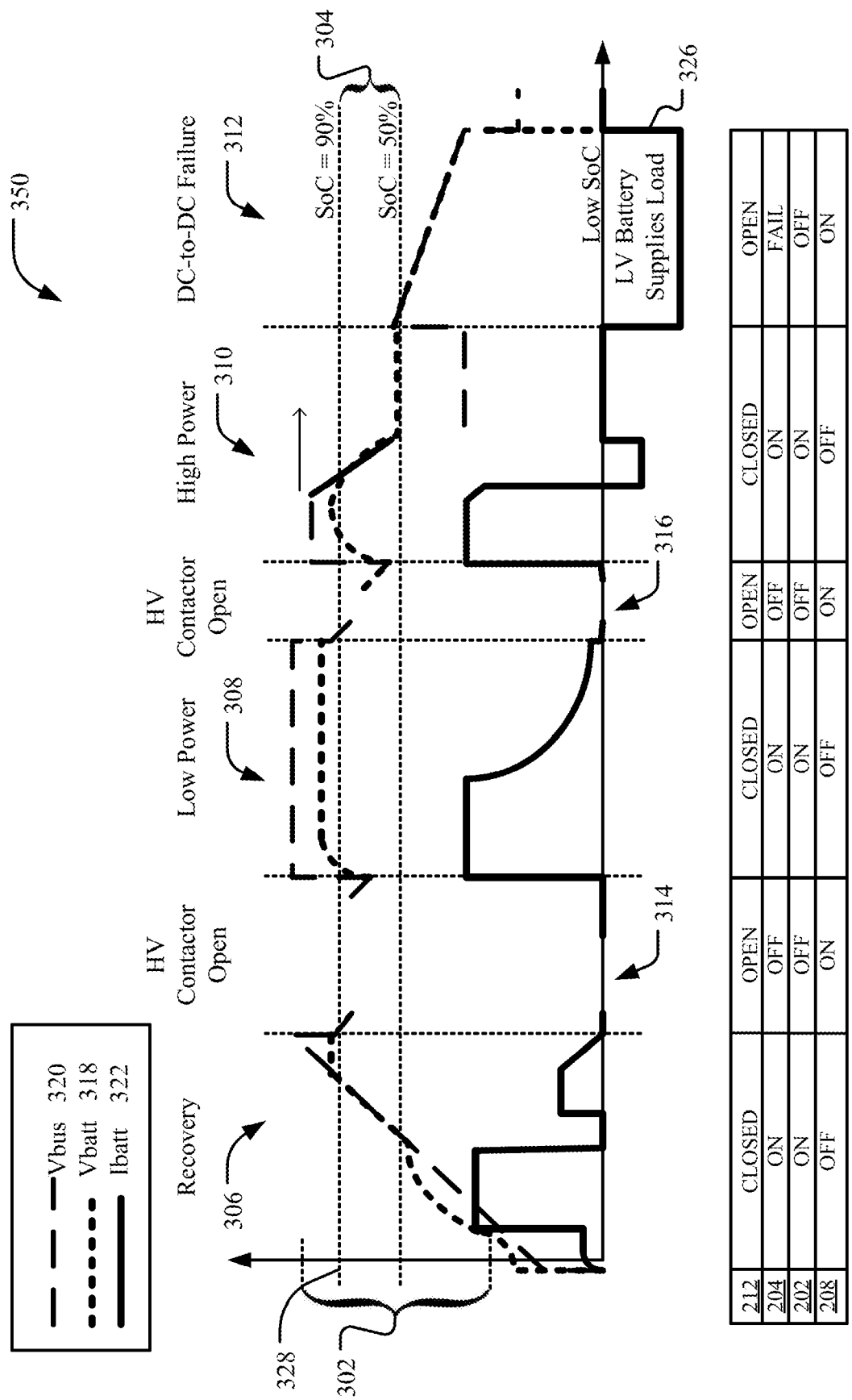
FIG. 3B is a second timing diagram illustrating bus voltage, low voltage battery voltage and low voltage battery current of the system of FIG. 2 in various example operational stages.

As can be understood from FIGS. 2A-2E and FIGS. 3A-3B, the system 200 may be deployed in a vehicle and converted to implement various operation modes. FIG. 2A-2e illustrate a recovery operational mode 220, a contactor open operational mode 230, a low power use operational mode 240, a high power use operational mode 260, and a DC-to-DC failure operational mode 280, respectively. The system 200 controls the current flow from the HV battery 214 and to and from the LV battery 216 during these operational modes using one or more switches, converters, and/or the like. FIGS. 3A and 3B show timing diagrams 300 and 350 illustrate voltages (Vbatt 318 shown in dashed lines) and currents (Ibatt 322 shown in solid lines) for the LV battery 216 and voltages (Vbus 320 shown in broken lines) for the LV bus 218, among other information associated with each of these operational modes and transitions among the same. FIG. 3B further illustrates a voltage supply of the LV battery 216 and across the LV bus 218 during these operational modes, with the LV battery 216 providing at least some of the voltage supply to the loads 210 to supplement or replace the HV battery 214 power during the high power use operational mode. It will be appreciated that these operational modes and the information and transitions associated therewith are exemplary only and not intended to be limiting.

Turning first to FIG. 2A, in one implementation, the system 200 is configured for the recovery operational mode 220, wherein a charge state of the LV battery 216 is depleted or otherwise below a nominal level. For example, the system 200 includes one or more loads 210, such as an air conditioning system, entertainment system, navigation system, and/or other vehicle subsystems or components. If the loads 210 operate for any extended time while only drawing power from the LV battery 216, the LV battery 216 may become depleted. In the recovery operational mode 220, the system 200 recharges the LV battery 216 until the charge state reaches the nominal level.

In one implementation, in the recovery operational mode 220, the HV contactor 212 is CLOSED, the unregulated DC-to-DC converter 202 and the regulated DC-to-DC converter 204 are ON, and the switch 208 is OFF. In this configuration, DC voltage is supplied from the HV battery 214 to the unregulated DC-to-DC converter 202. The DC voltage is then supplied from the unregulated DC-to-DC converter 202 to provide a change current in a first direction 222 to the regulated DC-to-DC converter 204 to charge the LV battery 216. The DC voltage is further supplied from unregulated DC-to-DC converter 202 along the LV bus 218 to provide a load current 224 the loads 210.

Referring to FIGS. 2A and 3A together, the timing diagram 300 includes recovery operational mode values 306 associated with the implementation of the system 200 in the recovery operational mode 220. As shown in FIG. 3A, the Vbatt 318 is in a low charge state below a nominal level 328 and an operational voltage range 302 for the LV battery 216. During the recovery operational mode 220, the Vbatt 318 increases as the charge state is recovered for the LV battery 216. For example, the Vbatt 318 may increase until the nominal level 328 is reached. The Vbatt 318 may be monitored until the charge state is reached.

The Ibatt 322 may be initially low during the recovery operational mode 220 to reduce a risk of any damage to the LV battery 216 in the low charge state. In the implementation shown in FIG. 3A, the Ibatt 322 jumps to a higher current level where it remains until the LV battery 216 is recharged to the appropriate level. The Ibatt 322 thus corresponds in this case to the Vbatt 318 during the recovery operational mode 220. Once the charge state is achieved, the Ibatt 322 decreases to a lower value where power is supplied to the LV battery 216 during a trickle or maintenance state. The Vbus 320 in the recovery operational mode values 306 depicts a voltage ramp indicative of no additional loads drawing power from the LV bus 218 during the recovery operational mode 220. The Vbus 320 may increase through an upper bound of a voltage range 304 of the LV bus 218.

Referring to FIGS. 2A and 3B, in another implementation of the recovery operational mode 220, the HV contact 212 is CLOSED and both the regulated DC-to-DC converter 204 and the unregulated DC-to-DC 202 are ON, thereby directing current from the LV bus 218 to the LV battery 216. As shown in FIG. 3B, the Vbatt 318 increases at a stable rate towards the nominal level 328, with the Ibatt 322 varying. Similar to FIG. 3A, as the power supplied across the LV bus 320 is not regulated, the Vbus 320 shows a ramp up in the recovery operational mode values 306.

For a detailed description of the system 200 in the contactor open operational mode 230, reference is made to FIG. 2B. In one implementation, the contactor open operational mode 230 includes the HV contactor 212 in an OPEN position with the unregulated DC-to-DC converter 202 and the regulated DC-to-DC converter 204 OFF. As such, no power is supplied to the loads 210 from the HV battery 214, and the LV battery 216 is not being recharged or actively maintained with power from the HV battery 214. Stated differently, no current flow is directed from the HV battery 214 to the LV battery 216 or the loads 210. The switch 208 may be set to ON, thereby providing power to the loads 210 from the LV battery 216.

Referring to FIGS. 3A and 3B in view of FIG. 2B, an example transition sequence from the recovery operational mode 220 to the contactor open operational mode 230 and an example transition sequence from the low power use operational mode 240 to the contactor open operational mode 230 are illustrated with contactor open operational mode values 314 and 316, respectively.

As discussed above, no current flow is supplied to the LV battery 216 in the contactor open operational mode 230. The Ibatt 322 thus falls to zero, and depending on a length of time the system 200 is operating in the contactor open operational mode 230 and/or an amount of power drawn from the LV battery 216 by the loads 210, the Vbatt 318 may similarly decrease. In one implementation, the system 200 selects one of the operational modes 220, 240, 260 or 280 based on a level of the Vbatt 318 following the contactor open operational mode 230. For example, if the LV battery 216 is too depleted, the system 200 may select and execute the recovery operational mode 220 prior to some other operational mode. In contrast, if the LV battery 216 is operational, albeit at some state of charge less than 100%, the system 200 may be able to operate in some other operational mode and recharge or use the LV battery 216 accordingly.

FIG. 2C illustrates the system 200 in the low power use mode 240 with only nominal operation occurring to reduce power usage. For example, when the system 200 is deployed in a vehicle, the low power use mode 240 may correspond to instances where the vehicle is parked and thus the only loads 210 ON are those pulling low voltage, such as monitoring memory, sensors, and/or the like.

In one implementation of the low power use mode 240, the HV contactor 212 is CLOSED, the unregulated DC-to-DC converter 202 and the regulated DC-to-DC converter 204 are ON, and the switch 208 is set to OFF. The HV battery 214 thus provides power to the loads 210 via the LV bus 218. The HV battery 214 further provides power to maintain the LV battery 216 via the regulated DC-to-DC converter 204. As can be understood from FIGS. 3A and 3B in connection with FIG. 2C, in one implementation, the Ibatt 322 is set an initial level and reduced as the Vbatt 318 reaches and remains at the nominal level 328. At this point, the Vbatt 318 is provided as a trickle charge in a first direction 242 to maintain the LV battery 216 and in a second direction 244 along the LV bus 218 to power the loads 210.

Low power use operational mode values 308 demonstrate that the LV battery 216 and the loads 210 draw little to no power from HV battery 214 via the LV bus 218 during the low power use mode 240. As such, the Vbatt 318 and the Vbus 320 have values at the upper limit of the operational voltage ranges 302 and 304, respectively. The operational voltage range 302 of the LV battery 216 may be approximately 39-54 VDC or 30-50 VDC with the upper limit being approximately 50 VDC, and the operational voltage range 304 of the LV bus 218 may be approximately 33-56 VDC, with the Vbus 320 being near 56 VDC during the low power use mode 240.

In one implementation, where the system 200 is transitioning from the contactor open mode 230 to the low power use mode 240 as shown with the contactor open operational mode values 314, the Ibatt 322 transitions from zero to a charge current that is sustained until the LV battery 216 reaches a charged state, at which time the Ibatt 322 drops. Similarly, the Vbatt 318 increases from a level of the contactor open mode 230 to the nominal level 328. The level of the contactor open mode 230 may be relatively lower due a gradually decreasing state of charge and some decrease in the voltage of the LV battery 26. The voltage supplied across the LV bus 218 supplied by the unregulated DC-to-DC converter 202 increases the Vbus 320 to the upper limit of the operational voltage range 304.

Referring to FIG. 2D, the system 200 is illustrated in the high power use operational mode 260 during which the system 200 is experiencing a high demand from the various low voltage systems, such as the loads 210 and/or the LV battery 216 to recharge it. The system 200 may alternatively or additionally have a high demand on the HV battery 214 by a traction motor or other high voltage systems.

In one implementation of the high power use operational mode 260, the HV contactor 212 is CLOSED, the unregulated DC-to-DC converter 202 and the regulated DC-to-DC converter 204 are ON, and the switch 208 is OFF. Where the regulated DC-to-DC converter 204 is bidirectional, the voltage across the LV bus 218 may be supplemented with the LV battery 216. As such, power for the loads 210 is supplied by the HV battery 214 across the LV bus 218 in a first direction 262, which is supplemented by power from the LV battery 216 across the regulated DC-to-DC converter 204 in a second direction 264.

Turning to FIG. 3A in the context of FIG. 2D, the high power use operational mode 260 supplies power to the loads 210 via the LV bus 218, with the Vbus 320 thus being high. In the example case shown in FIG. 3A, the low voltage battery is initially somewhat discharged so that besides providing power to the loads, power is also required to provide a charge current iBatt to the low voltage battery, which is decreased when some sufficient state of charge is reached (e.g., 90%).

In one implementation, the regulated DC-to-DC converter 204 contains one or more sensors configured to sense voltage and current levels output for the LV battery 216. The sensors of the regulated DC-to-DC converter 204 may create current and voltage loops, which may be used to monitor output impedance for regulating the voltage and current output by the regulated DC-to-DC converter 204. For example, a current sensor can be located above the regulated DC-to-DC converter 204 to create a current loop for monitoring current at an output of the regulated DC-to-DC converter 204 to determine whether to increase the output of the regulated DC-to-DC converter 204. Similarly, the regulated DC-to-DC converter 204 may also include a voltage sensor located below the regulated DC-to-DC converter 204 for voltage regulation. The voltage sensor creates a voltage loop back into the regulated DC-to-DC converter 204 to reduce output impedance by measuring the Vbatt 318 and the Vbus 320. If the Vbatt 318 is greater than the Vbus 320, the LV battery 216 discharges on the LV bus 218 by way of the bidirectional regulated DC-to-DC converter 204 in the second direction 264. The LV battery 216 thus provides reduced output impedance at the regulator 206, while maintaining the Vbatt 318 less than or equal to the Vbus 320.

The compensation by the LV battery 216 in the high power use operational mode 260 is illustrated in FIG. 3B with the high power use operational mode values 310. In particular, the high power use operational mode values 310 of FIG. 3B show the Vbatt 318 dropping as the LV battery 216 directs voltage through the regulated DC-to-DC converter 204 to the LV bus 218 as the state of charge of the LV battery 216 depletes, which may be reflected in the voltage of the battery. Because the LV battery 216 is supplementing the voltage across the LV bus 218, the Ibatt 322 is shown as a negative value meaning it is sourcing current as compared to FIG. 3A where the battery is being charged during high power mode. With the Vbatt 318 reaching the lower limit of the operational range 304 (e.g., at or below 50% SOC), the regulated DC-to-DC converter 204 may be turned OFF so as to not drain the low voltage battery further.

For a detailed description of the system 200 operating in the DC-to-DC failure operational mode 280, reference is made to FIG. 2E. As described herein, the unregulated DC-to-DC converter 202 may malfunction or otherwise become incapable of powering the loads 210. DC-to-DC converter failure can occur for numerous reasons and be indicated by a reduction in voltage across the LV bus 218 to below a threshold. During such failures, the LV battery 216 may power the loads 210 while the LV battery 216 has sufficient charge. FIGS. 3A and 3B illustrate a scenario where the converter fails and the low voltage battery is at a 90% SOC and a 50% SOC, respectively. When such a failure occurs, the low voltage battery is connected to the bus through the switch 208 (ON). As illustrated, iBatt is drawn from the battery and supplies the loads and the length of time that is able to supply the loads will depend on the load being drawn as well as the SOC among other factors. In one implementation of the DC-to-DC failure operational mode 280, the HV contactor 212 is OPEN, the regulated DC-to-DC converter 204 is turned OFF, and the switch 208 is turned ON to provide power from the LV battery 216 across the LV bus 218 in a first direction 282 and across the switch 208 in a second direction 284.

Figure 4:
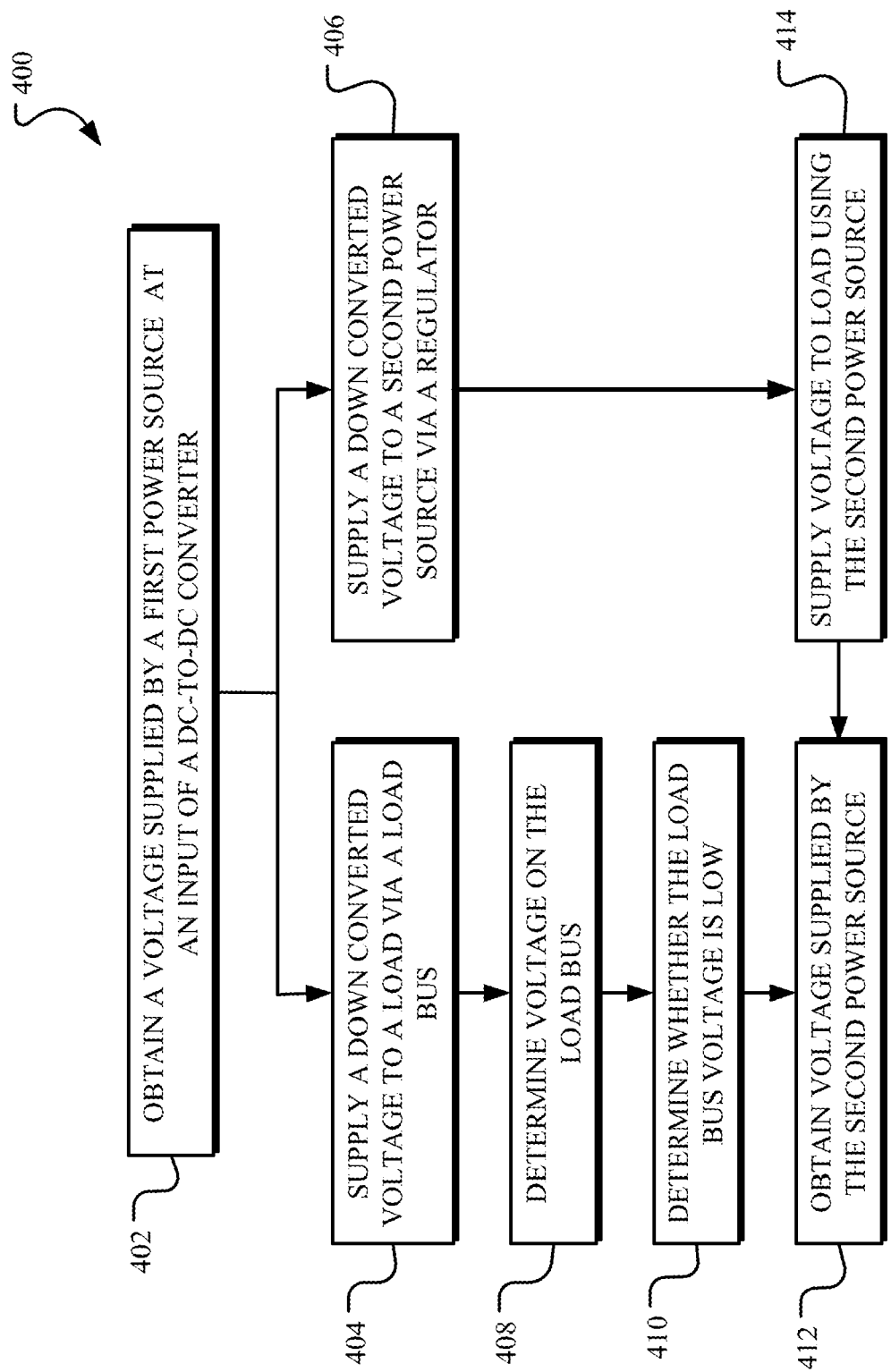
FIG. 4 is a flowchart of example operations for providing a load voltage supply using a combination of an unregulated DC-to-DC converter for powering a bus and a regulated converter for charging or sourcing current from a low voltage battery system.

For a detailed description of example operations 400 for providing a load voltage supply using an unregulated DC-to-DC converter and a low voltage battery system, reference is made to FIG. 4. It will be appreciated that the operations 400 may be implemented using the system 100 or 200 and in various operation modes, including but not limited to the operation modes 220, 230, 240, 260, and 280, as well as other systems and operation modes. The operations 400 may further be implemented in the context of a vehicle or other device where power is drawn from a high voltage source and converted to provide low voltage to one or more loads or low voltage power sources.

In one implementation, an operation 402 obtains a voltage supplied by a first power source, such as a high voltage battery, at an input of a DC-to-DC converter. A contactor, such as a high voltage contactor, may be disposed between the first power source and the DC-to-DC converter to control the flow of voltage from the first power source. The DC-to-DC converter may be unregulated, regulated, isolated, non-isolated, step-up, step-down, inversion, and/or the like. For example, the DC-to-DC converter may be a voltage down converter receiving the voltage supplied by the first power source at the input and outputting a down converted voltage for one or more loads, batteries, and/or other systems operating at the down converted voltage. In another example, the DC-to-DC converter is an isolated unregulated DC-to-DC converter, providing dielectric isolation between the input and an output of the DC-to-DC converter to provide isolation for one or more loads, such as wipers, air conditioning units, lamp lights, dashboards, and/or the like.

An operation 404 supplies the down converted voltage to one or more loads via a bus. In addition or alternatively to the operation 404, an operation 406 supplies the down converted voltage to a second power source, which may be a low voltage battery. In one implementation, the operation 406 supplies the down converted voltage to the second power source via the bus and a regulated DC-to-DC converter. In one implementation, the voltage across the bus ranges from approximately 50% to 90% of a voltage of a second power source, such as a low voltage battery, connected to the bus. In another implementation, a regulator is connected to the bus to increase or otherwise regulate the voltage. For example, where the first power source is a high voltage battery with voltage range of approximately 650-900 VDC, the bus voltage has a voltage range of approximately 39-54 VDC (i.e., 50%-90%). As another example, the first power source is a high voltage battery with voltage range of approximately 270-450 VDC, and the bus voltage has a voltage range of approximately 39-54 VDC. With the use of the regulator in the form of a non-isolated, regulated DC-to-DC converter, the bus may have a change of voltage range of approximately 33-56 VDC, which corresponds to approximately ⅛ of the high voltage of the first power source. Therefore, the voltage on the bus may be higher or lower than the voltage of the second power source, which a range of approximately 30-50 VDC.

The regulated DC-to-DC converter can be operable at a lower power than the unregulated DC-to-DC converter used by the operation 404 to down convert the high voltage provided by the first power source. For example, the operation 404 may utilize a 4 kW DC-to-DC converter to down convert the voltage from the first power source, and the operation 406 may utilize a 500 W non-isolated, regulated DC-to-DC converter to supply power to the second power source for charging. In some implementations, the operation 406 turns the regulated DC-to-DC converter off when the second power source is not being charged, thereby increasing efficiency of the system.

In one implementation, operations 408-414 ensure the loads receive adequate voltage for operation by providing a voltage across the bus within an operating range of the loads. The operation 408 senses a voltage across the bus and determines whether the bus voltage is within the operating range of the loads. If the bus voltage drops below the operational range of the loads, the operation 410 may identify a malfunction of the unregulated DC-to-DC converter. The operation 410 may automatically identify an alternate power source, such as the second power source. Once the second power source is identified, the operation 410 enables a switch or bidirectional functionality of the regulated DC-to-DC converter to connect the second power source to the bus to provide power to the loads. Additionally or alternatively, the operation 410 may use a voltage sensor that triggers the switch to turn ON where the voltage across the bus is low. Once the switch or bidirectional functionality of the regulated DC-to-DC converted is triggered, the operation 412 supplies voltage to the loads from the second power source via the bus.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
   an unregulated DC-to-DC converter electrically connected to a first energy source to down convert a first voltage supplied by the first energy source into a down converted first voltage, wherein the first energy source is connected in series with the unregulated DC-to-DC converter;
   a load electrically connected to the unregulated DC-to-DC converter to receive the down converted first voltage;
   a regulated DC-to-DC converter electrically connected in series to the unregulated DC-to-DC converter to regulate the down converted first voltage to a second voltage;
   a second energy source electrically connected to the regulated DC-to-DC converter to charge the second energy source using the second voltage, the second energy source switchably connectable to the load, wherein the second energy source is connected in series with the regulated DC-to-DC converter; and
   a switch electrically connected in parallel with the regulated DC-to-DC converter, wherein the second energy source connects to the load through the switch to supply the load.

2. The apparatus from claim 1, wherein the first energy source is a first battery operable at a nominal 800V.

3. The apparatus of claim 1, wherein the second energy source is a low voltage battery operable at a nominal 48V.

4. The apparatus of claim 1, further comprising a low voltage bus connecting the unregulated DC-to-DC converter to the load.

5. The apparatus of claim 1, wherein the switch is a MOSFET switch.

6. The apparatus of claim 1, wherein the regulated DC-to-DC converter is bidirectional, and wherein the second power source provides power to the load through the bidirectional regulated DC-to-DC converter.

7. The apparatus of claim 6, wherein the power to the load through the regulated DC-to-DC converter is supplied in conjunction with the down converted first voltage.

8. The apparatus of claim 1, wherein the switch supplies power to the load from the second energy source during a failure of the unregulated DC-to-DC converter.

9. The apparatus of claim 4, further comprising:
   a regulator electrically connected between the bus and the load.

10. The apparatus of claim 1, wherein the regulated DC-to-DC converter is a non-isolated buck-boost converter and the unregulated DC-to-DC converter is isolated.

11. A method comprising:
    obtaining a first voltage at an input of an unregulated DC-to-DC converter from a first energy source, the unregulated DC-to-DC converter down converting the first voltage to a second voltage, wherein the first energy source is connected in series with the unregulated DC-to-DC converter;
    supplying the second voltage to a load from the unregulated DC-to-DC converter via a bus;
    supplying the second voltage to a regulated DC-to-DC converter, wherein the regulated DC-to-DC converter is electrically connected in series to the unregulated DC-to-DC converter, wherein the regulated DC-to-DC converter is operable to provide a charging current to a second energy source, wherein the second energy source is connected in series with the regulated DC-to-DC converter; and activating a switch electrically connected in parallel with the regulated DC-to-DC converter to power the load using the second power source.

12. The method of claim 11, wherein the first energy source is a first battery operable at a nominal 800V and the second energy source is a second battery operable at a nominal 48V.

13. The method of claim 11, wherein the regulated DC-to-DC converter is bidirectional, the method further comprising:

supplying additional power to the load from the second energy source, the additional power through the bidirectional regulated DC-to-DC converter.

14. The method of claim 11, further comprising detecting a failure of the unregulated DC-to-DC converter.

15. An apparatus comprising:

an isolated unregulated DC-to-DC converter with a first input and a second input, the first input of the unregulated DC-to-DC converter is switchably connected in series to a first energy source at a first voltage, wherein the unregulated DC-to-DC converter down converts the first voltage to a second voltage on a bus;

a load electrically connected to the bus;

a regulated DC-to-DC converter electrically connected to the bus;

a second power source electrically connected in series to the regulated DC-to-DC converter, the regulated DC-to-DC converter operable to charge the second power source or to source current from the second power source; and a switch connected in parallel with the regulated DC-to-DC converter, to switchably connect the second power source to the bus to provide power to the load.

16. The apparatus of claim 15 wherein the second power source is operable to connect to the bus to supplement power to the bus in conjunction with the isolated unregulated DC-to-DC converter or to solely source power on the bus when the isolated unregulated DC-to-DC converter is not powering the bus.

17. The apparatus of claim 15 wherein:

the first energy source operates in a range of 650-900 volts DC;

the second energy source operates in a range 30-50 volts DC; and the bus operates in a range of 39-54 volts DC.

18. The apparatus of claim 15 wherein the isolated unregulated DC-to-DC converter is 4 Kilowatt and the regulated DC-to-DC converter is 500 Watts.

19. The apparatus of claim 15 further comprising a regulator connected between the bus and the load.

* * * * *